US 6,626,398 B1

(12) United States Patent
Cox et al.

(10) Patent No.: US 6,626,398 B1
(45) Date of Patent: Sep. 30, 2003

(54) UNMANNED BIPLANE FOR AIRBORNE RECONNAISSANCE AND SURVEILLANCE HAVING STAGGERED AND GAPPED WINGS

(75) Inventors: Beverly Cox, San Antonio, TX (US); Hampton Dews, Medina, TX (US); Nicholas Nyroth, Chase Hill Blvd (SE)

(73) Assignee: Mission Technologies, Inc., San Antonio, TX (US)

( * ) Notice: Subject to any disclaimer, the term of this patent is extended or adjusted under 35 U.S.C. 154(b) by 29 days.

(21) Appl. No.: 10/143,603

(22) Filed: May 10, 2002

Related U.S. Application Data

(60) Provisional application No. 60/290,842, filed on May 10, 2001.

(51) Int. Cl.⁷ .................................................. B64C 3/38
(52) U.S. Cl. ...................................................... 244/45 R
(58) Field of Search ................................ 246/45 R, 13, 246/15, 46

(56) References Cited

U.S. PATENT DOCUMENTS

| | | | | |
|---|---|---|---|---|
| 1,749,769 A | * | 3/1930 | Johnson ........................ 244/49 |
| 3,985,317 A | * | 10/1976 | Gersci et al. .............. 244/15 R |
| 4,053,125 A | * | 10/1977 | Ratony ........................ 244/46 |
| 4,856,736 A | * | 8/1989 | Adkins et al. ............. 244/15 R |
| 5,046,684 A | * | 9/1991 | Wolkovitch ................ 244/45 R |
| 5,615,846 A | * | 4/1997 | Shmoldas et al. ............. 244/49 |
| 5,779,190 A | * | 7/1998 | Rambo et al. ................. 244/54 |
| 5,899,410 A | | 5/1999 | Garrett |
| 6,056,237 A | * | 5/2000 | Woodland .................... 244/120 |
| 6,098,923 A | | 8/2000 | Peters, Jr. |

\* cited by examiner

*Primary Examiner*—Galen L. Barefoot
(74) *Attorney, Agent, or Firm*—Jackson Walker, LLP

(57) ABSTRACT

The present invention provides an unmanned airborne reconnaissance vehicle having a fuselage, a forward wing pair and a rearward wing pair vertically separated by a gap and staggered fore and aft therebetween such that a general biplane configuration is formed. The present invention provides a pair of wing tip plates for joining the wing tips of the forward and rearward wings. The unmanned airborne reconnaissance vehicle of the present invention includes a power plant to propel the vehicle through the air and a generally T-shaped tail having a vertical stabilizer including a rudder and a full span elevator.

20 Claims, 5 Drawing Sheets

| UPPER WING | | LOWER WING | | X | Y | X | Y |
|---|---|---|---|---|---|---|---|
| X | Y | X | Y | | | 27.369 | 23.057 |
| 27.490 | 27.297 | 27.369 | 23.057 | 27.490 | 27.297 | 27.372 | 23.029 |
| 27.492 | 27.311 | 27.370 | 23.077 | 27.494 | 27.273 | 27.380 | 23.002 |
| 27.527 | 27.378 | 27.376 | 23.105 | 27.561 | 27.210 | 37.395 | 22.975 |
| 27.598 | 27.453 | 27.393 | 23.149 | 27.666 | 27.162 | 27.416 | 22.946 |
| 27.705 | 27.531 | 27.413 | 23.184 | 27.811 | 27.116 | 27.444 | 22.917 |
| 27.844 | 27.610 | 27.447 | 23.231 | 27.996 | 27.074 | 27.482 | 22.884 |
| 28.016 | 27.687 | 27.487 | 23.274 | 28.217 | 27.038 | 27.530 | 22.850 |
| 28.218 | 27.761 | 27.562 | 23.343 | 28.474 | 20.004 | 27.593 | 22.812 |
| 28.448 | 27.828 | 27.633 | 23.395 | 28.764 | 26.977 | 27.671 | 22.773 |
| 28.705 | 27.888 | 27.717 | 23.449 | 29.083 | 26.956 | 27.766 | 22.733 |
| 28.985 | 27.939 | 27.793 | 23.492 | 29.429 | 26.942 | 27.875 | 22.695 |
| 29.287 | 27.978 | 27.878 | 23.534 | 29.798 | 26.933 | 27.997 | 22.659 |
| 29.609 | 28.006 | 27.991 | 23.584 | 30.186 | 26.930 | 28.127 | 22.626 |
| 29.947 | 28.020 | 28.137 | 23.639 | 30.590 | 26.933 | 28.264 | 22.597 |
| 30.300 | 28.022 | 28.320 | 23.697 | 31.008 | 26.942 | 28.408 | 22.572 |
| 30.664 | 28.009 | 28.512 | 23.747 | 31.428 | 26.956 | 28.649 | 22.539 |
| 31.037 | 27.983 | 28.712 | 23.789 | 31.855 | 26.974 | 28.960 | 22.509 |
| 31.416 | 27.944 | 28.889 | 23.819 | 32.261 | 26.997 | 29.278 | 22.490 |
| 31.798 | 27.892 | 29.099 | 23.848 | 32.702 | 27.020 | 29.603 | 22.480 |
| 32.181 | 27.828 | 29.345 | 23.872 | 33.115 | 27.042 | 29.931 | 22.479 |
| 32.562 | 27.756 | 29.719 | 23.894 | 33.511 | 27.062 | 30.261 | 22.487 |
| 32.937 | 27.677 | 30.096 | 23.897 | 33.886 | 27.077 | 30.593 | 22.501 |
| 33.303 | 27.595 | 30.413 | 23.887 | 34.233 | 27.088 | 30.926 | 22.522 |
| 33.655 | 27.510 | 30.730 | 23.865 | 34.547 | 27.095 | 31.260 | 22.549 |
| 33.990 | 27.435 | 31.240 | 23.793 | 34.829 | 27.086 | 31.595 | 22.580 |
| 34.279 | 27.370 | 31.599 | 23.733 | 35.491 | 27.071 | 31.935 | 22.615 |
| 34.567 | 27.310 | 31.900 | 23.674 | | | 32.281 | 22.652 |
| 34.829 | 27.257 | 32.195 | 23.613 | | | 32.628 | 22.689 |
| 35.028 | 27.221 | 32.463 | 23.564 | | | 32.908 | 22.720 |
| 35.243 | 27.184 | 32.802 | 23.503 | | | 33.120 | 22.743 |
| 35.310 | 27.176 | 33.126 | 23.443 | | | 35.373 | 22.927 |
| 35.402 | 27.163 | 35.375 | 23.047 | | | | |
| 35.493 | 27.152 | | | | | | |

Fig. 5

UNMANNED BIPLANE FOR AIRBORNE RECONNAISSANCE AND SURVEILLANCE HAVING STAGGERED AND GAPPED WINGS

This patent application claims priority from a provisional application entitled "A Small, Unmanned, Airborne Surveillance Vehicle", Ser. No. 60/290,842, filed on May 10, 2001.

FIELD OF THE INVENTION

The present invention is directed to an unmanned aerial vehicle in the nature of a biplane, that is portable, modular and includes a forward pair of wings and a rearward pair of wings, the wings being staggered fore and aft and vertically separated at their wing tips, the wing tips engaged through a pair of tip plates.

BACKGROUND OF THE INVENTION

Unmanned aerial vehicles have been complex and difficult to operate in their intended environment. What is needed is an unmanned aerial vehicle that is modular, provides an airfoil that will give high lift and low drag loiter, cruise and dash speeds, yet provide stability for a variety of payloads.

There has been a resurgence of interest in the use of unmanned aerial vehicles having an airplane type configuration for performing a variety of aerial missions where the use of manned flight vehicles is not deemed appropriate. Such aerial missions include surveillance, reconnaissance, target acquisition and/or designation, data acquisition, mine detection, communications relay, decoy, jamming, harassment, or supply flights. Many types of ground surveillance missions are beyond the practical capabilities of a human observer due to the inability to see over a hill. For example, missions that are inherently hazardous or that require surveillance at multiple sites over a short time span.

Currently, small UAVs are being used by various governments, primarily in military operations. Many of these UAVs, however, are unwieldy and large due to their conventional wing configurations, or required logistical support.

No lightweight UAV currently available employs novel wing configuration capable of providing a substantial payload in a relatively compact package of limited wing span while maintaining an exceptional airspeed envelope over which it will provide a stable platform for missions data collection.

SUMMARY OF THE INVENTION

It is an object of the present invention to provide an unmanned aerial vehicle that is easy to assemble using simple tools and toolless assembly methods.

It is another object of the present invention to provide an aircraft that is modular.

It is also an object of the present invention to provide an aircraft that is light in weight and easy to assemble.

It is an object of the present invention to provide an aircraft that is stable at a wide range of operational speeds.

It is another object of the present invention to provide an unmanned aerial vehicle that has the capability to carry various heavy payloads (such as an infrared camera) in relationship to its size and weight and still maintain its intrinsic flight characteristics.

It is an object of the present invention to provide for a simple system of emergency parachute deployment for emergency landing of the unmanned aerial vehicle.

It is another object of the present invention to provide for an unmanned aerial vehicle with remote control and wireless transmission of imagery from one or more onboard sensors for display at a remote ground control station.

It is another object of the present invention to provide a novel wing configuration capable of providing a sufficient flight envelope and stable platform for payloads including infrared, thermal imagers, low light T.V. cameras or video cameras and associated surveillance apparatus.

Applicants provide for these and other objects in an unmanned airborne reconnaissance vehicle having a fuselage, a forward wing pair and a rearward wing pair, the two wing pairs separated vertically by a gap and staggered fore and aft therebetween, forming a general biplane configuration, and including a pair of tip plates for joining the wing tips.

This and other objects are provided in Applicant's novel staggerwinged biplane having vertically and horizontally separated tips and stagger between the trailing edge of the forward wings and a leading edge of the rearward wings, the novel biplane further including a power plant to propel the vehicle through the air.

This and other objects are provided for in Applicants' novel biplane configuration that may include a generally T-shaped tail having a vertical stabilizer including a rudder and a horizontal stabilator, or a conventional tail with a tractor mounted powerplant.

This and other objects are provided in Applicants' novel stagger winged biplane UAV including ailerons on a rear wing pair.

This and other objects are provided in Applicants' novel stagger winged, biplane UAV further including a novel custom airfoil for optimized flight speed envelope.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein:

FIG. 5 is a table of airfoil defining Cartesian coordinates utilized in one embodiment of the present invention.

DETAILED DESCRIPTION OF THE INVENTION

Figure 1:
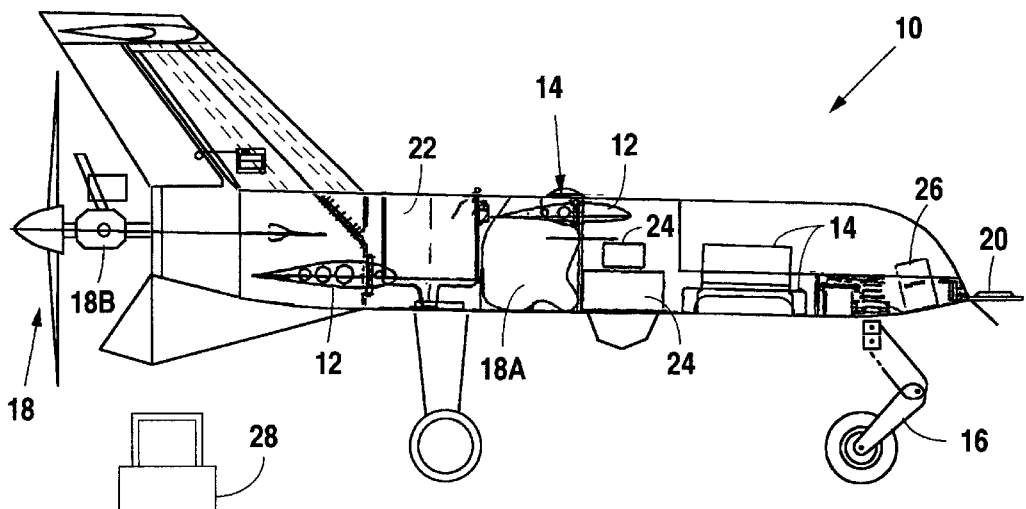
FIG. 1 is a side, elevation view illustrating some of the internal components of the unmanned aerial vehicle of the present invention in one embodiment.

Referring to the Figures, the present invention is herein described as an unmanned airborne reconnaissance vehicle. FIG. 1 illustrates Applicants' UAV system (10), the system including an airframe (12), a data link system (14), an undercarriage (16), a propulsion system (18) including a fuel system bladder (18A), a power plant (18B), avionics (20), and a recovery system (22), such as a parachute for deployment from an onboard container. In one embodiment, the UAV system (10) of the present invention includes at least one payload (24), such as an onboard infrared camera, and an electrical system (26). In one embodiment, the present invention is equipped with one or more ground control stations (28) which may include ground support equipment.

The airframe (12) utilized by the present invention will be discussed in greater detail below, but is designed to provide a stable platform for reconnaissance and surveillance equipment or deliverance of varied payloads and/or biochem detection equipment.

Applicants' airframe (12) is highly maneuverable, has high dash speed capability, and exhibits a very slow loiter speed. This system is sufficiently mobile and is operated by a small crew requiring minimal training and equipment. The ground control station (28) includes real time displays that show latitude and longitude coordinates, ground speed, GPS heading, programmed waypoints, heading to target waypoint, GPS signal quality, airspeed, altitude, engine RPM, engine temperature and line voltages and real time imagery.

Figure 2:
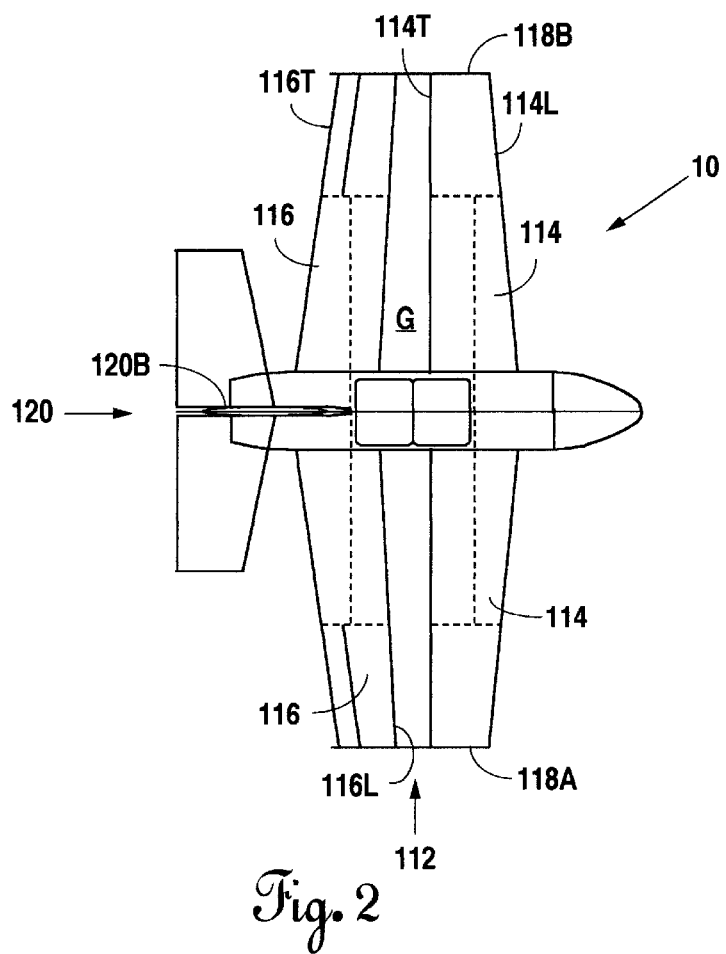
FIG. 2 is a plan view of the unmanned aerial vehicle of the present invention in one embodiment.
Figure 3:
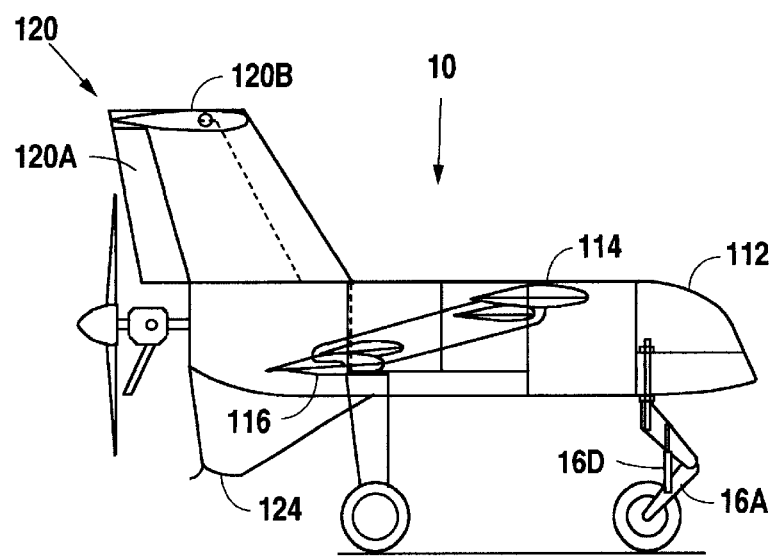
FIG. 3 is a front, elevation view of the unmanned aerial vehicle of the present invention in one embodiment.
Figure 4:
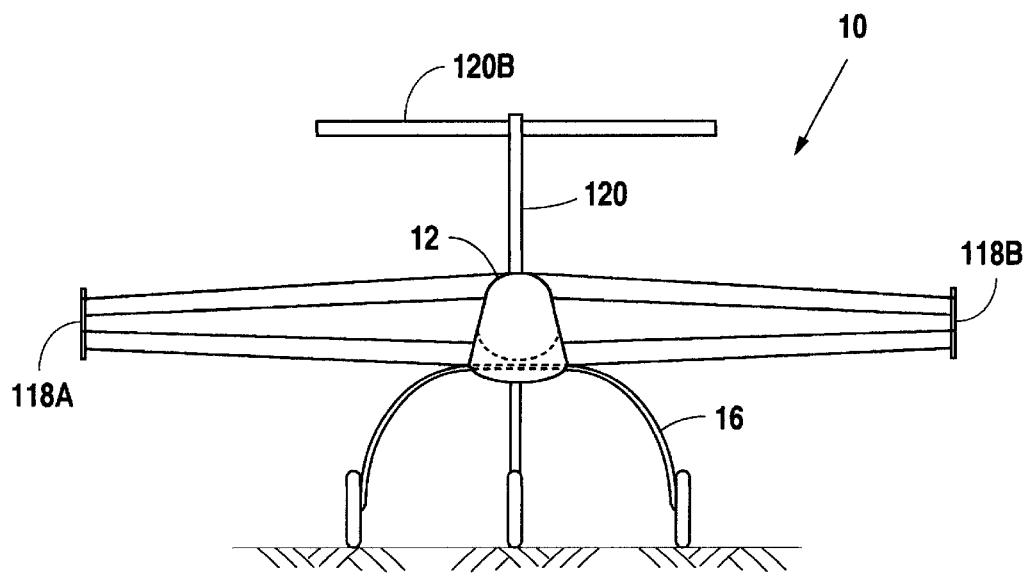
FIG. 4 is a side elevation view of the unmanned aerial vehicle of the present invention in one embodiment.

FIGS. 2, 3 and 4 illustrate Applicants' novel airframe (12) including a fuselage (112) which is attached to wings. A forward wing pair (114) includes a leading edge (114L) and a trailing edge (114T) and a rearward wing pair (116) includes a leading edge (116L) and a trailing edge (116T). In FIG. 2, a plan view, it is seen that the two wing pairs are separated by stagger (G) between the trailing edge of the forwarding wing pair (114) and the leading edge of the rearward wing pair(116). This is also seen in FIG. 4, a side elevational view. In FIGS. 3 and 4, it may be seen that the two wing pairs (114 and 116, respectively) also have vertical separation defining a gap and are staggered, with positive stagger, the fore wing pair being in front of and above the rear wing pair.

The wing tips are attached to one another for structure support using a pair of wing tip plates (118A and 118B, respectively) which may also function to enhance low speed flight characteristics. Applicants' airframe is seen to include a t-shaped tail (120), the tail having a vertical stabilizer including a rudder (120A) and a stabilator (120B). Applicants' may also provide attached to the airframe an undercarriage system including, in one embodiment, a tricycle main landing gear (16A) having a nose wheel including a jointed arm (16A) which may include a shock absorbing and damping element (16D) between the two arms thereof to help cushion a landing. Applicants' novel landing gear may include a pair of wheels mounted to a spring composite frame as illustrated in FIG. 3. Applicant's fuselage (12) may include a ventral fin (not shown) for added yaw and roll stability.

Dimensions Table I set forth below provides preferred dimensions and a range of dimensions for the forward pair and rearward pair and tail.

TABLE 1

| | Preferred | Range |
|---|---|---|
| Forward Wing | | |
| Leading edge sweep | 7° | 0–20° |
| Trailing edge sweep | 1° | 0–20° |
| Anhedral | 3° | −10 to +10° |
| Wingspan | 84" | 80"–120" |
| Tip Chord | 7.9" | 5"–10" |
| Root Chord | 12.0" | 10"–15" |

TABLE 1-continued

| | Preferred | Range |
|---|---|---|
| C.G. Location | 2.0" fwd of t.e. | 0.0" to 4.0" fwd of t.e. |
| Angle of Attack | 0° | −2° to +2° |
| Airfoil (see attached FIG. 5 and FIG. 6) | | |
| Rearward Wing | | |
| Leading edge sweep | 3° | 0–20° |
| Trailing edge sweep | 8° | 0–20° |
| Dihedral | 3° | −10° to +10° |
| Angle of Attack | 0° | −2° to +2° |
| Wingspan | 84" | 80"–120" |
| Tip Chord | 7.9" | 5"–10" |
| Root Chord | 12.0" | 10"–15" |
| Aileron on Aft wings | 2.6" × 12.0" | 2"–4" × 10"–15" |
| Airfoil (see attached FIG. 5 and FIG. 6) | | |
| Tail (Elevator) | | |
| Surface span | 38.0" | 35"–45" |
| Chord Tip | 9.0" | 8"–10" |
| Chord Root | 12.0" | 10"–15" |
| Angle of Attack | −1.5° | 0°–3° |
| Airfoil NACA0010 Full Symmetric | | |

Applicants' vertical separation as seen in FIGS. 3 and 4 and as measured between the root cords (vertically) is 5 inches preferred, range 4 to 6 inches. The positive stagger as seen best in FIG. 4 is preferably 20 inches between the leading edge of the front wing and the leading edge of the rear wing, measured at the wing roots (range 16 to 24 inches), with the stagger measured between the trailing edge of the front wing to the trailing edge of the rear wing being 19.5 inches preferred (range 16 to 24 inches). The fuselage may be about 80 inches long with the preferred dimensions above, and about 7½ inches wide at the top and 12 inches wide at the bottom. The wheelbase of the landing gear in the preferred embodiment is approximately 32 inches.

Figure 6:
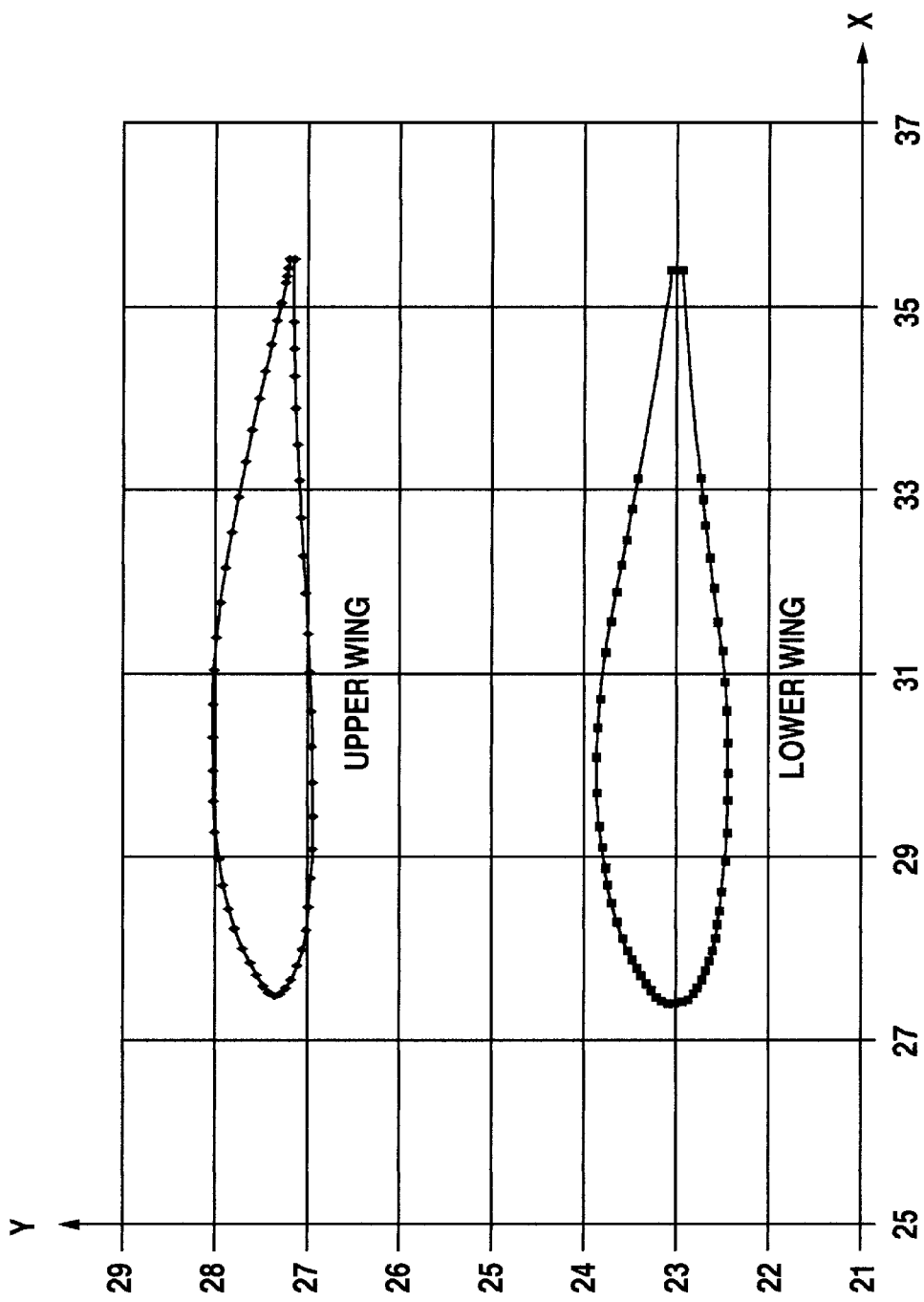
FIG. 6 is a graphic diagram illustrating the airfoil defining Cartesian coordinates utilized in one embodiment of the present invention.

The table of FIG. 5 illustrates a custom airfoil for use with the forward and rearward wing. The table gives the X and Y dimensions along a Cartesian coordinate. The x and y coordinates may be entered into a PC which has CAD software, and a chord selected. The custom airfoil may then be printed and properly scaled, as illustrated by FIG. 6. This airfoil has been found to provide efficient lift over an airspeed between approximately 25 knots and 120 knots, while maintaining a stable platform for the UAV.

Figure 7:
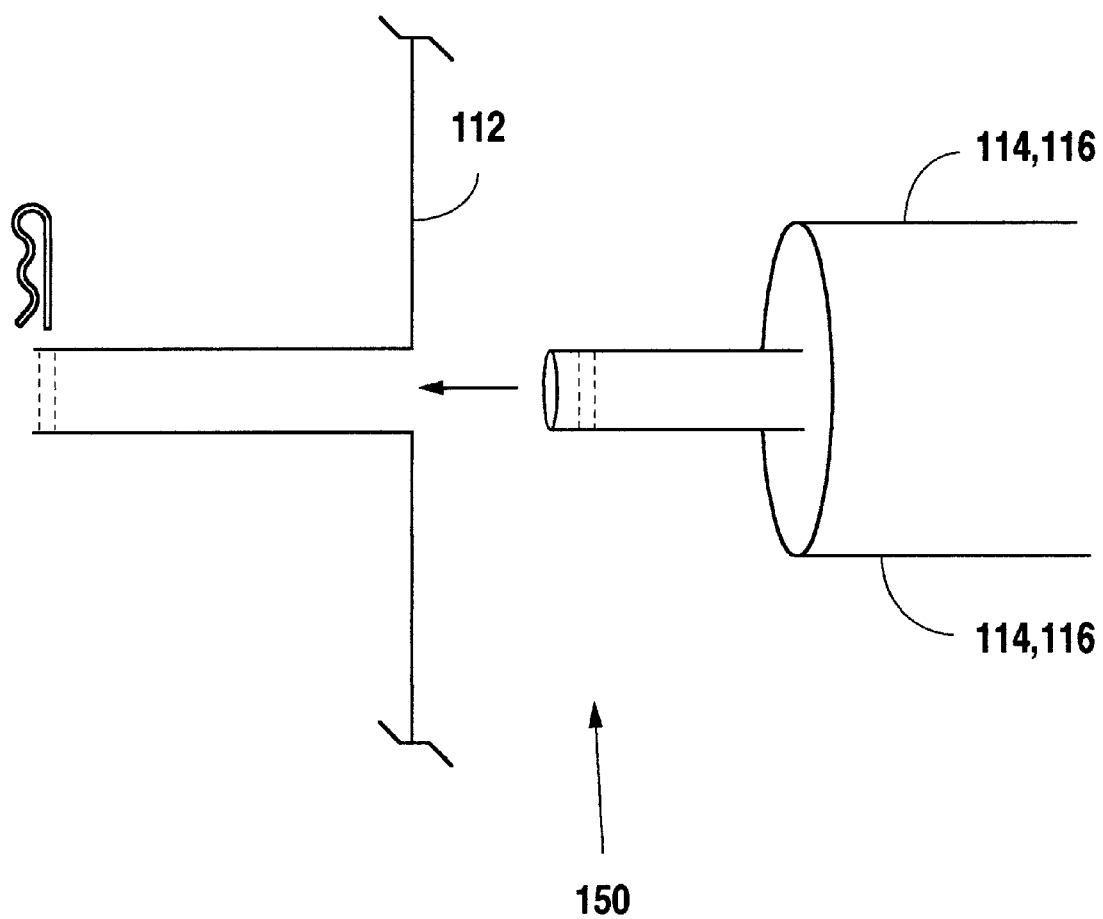
FIG. 7 is an elevational view of a manner by which the two wing pairs are removably fastened to the fuselage.

Applicants' airframe (12) may be a modular, composite structure (carbon fiber and fiberglass) and disassembles into major components for storage and transportation. In one embodiment, at least a portion of the attachments and fittings are of the "quick disconnect" type (150), as illustrated in FIG. 7.

With Applicants' preferred dimensions, Applicants' novel UAV may reach a maximum altitude of 16,000 feet MSL, a maximum dash speed of 110 mph, a cruise speed of 65 mph, a loiter speed of 55 mph and a stall speed of 50 mph in an airframe with empty weight of 60 pounds and payload of 40 pounds.

The flight management system (FMS) for Applicants' UAV may be provided by an onboard FMS and a GPS (waypoint) navigational system supplied by a 12-volt DC battery and built-in generator. The navigation may be fully autonomous with a waypoint preprogrammed flight plan, and flight updates and auto pilot with direct control modes. The GPS may be connected to an active onboard GPS antenna. The uplink channel from the antenna is typically narrow band FM. The UAV airborne datalink system consists of two parts: the transmitter and antenna. The system transmits the combined air vehicle data/GPS data signal and video data from the onboard payload to the GCS using a carrier frequency and a sound subcarrier.

In one embodiment, the ground base components consist of two parts: receiver and antenna. The directional antenna receive the transmitted air vehicle data/GPS/imagery signal, and processes same into two separate audio and video data streams. These are then routed to the GCS. The flight management system (FMS) creates a fully autonomous navigation system providing multipoint guidance and telemetry transmission of all essential parameters. The avionics are monitored and controlled via the UVA ground control system (GCS). The avionics navigational module consists of an IMV for pitch/roll. It also contains uplink receivers, and control outputs for all control surfaces and functions. The auto pilot interprets the data received from a sensor package, which provides functional flight control and defined failure recovery that can be overridden manually anytime by the external pilot.

The air vehicle built-in sensors include sensors for: engine temperature, engine RPM, battery voltage, airspeed, attitude (pitch/roll), altitude and heading. The navigational module makes its calculations based on sensor data from the UAVs built-in sensors, GPS position system and preprogrammed waypoints. Data is collected continuously and updated, in the ground control system (GCS) monitor every two seconds.

The air vehicle may include a forward looking video camera such as a fixed video camera with appropriate tilt field of view and resolution. The camera is one of the smallest color video cameras employing VSLI and CCD technology for awareness of objects in the flight path, as a pilot eye camera. A transmitter is provided to downlink the video from the pilot's eye camera.

Ground control station (28) equipment includes a PC (laptop preferred), appropriate software, a VCR to record payload video and a monitor for payload video monitoring. The computer displays UAV real time dynamic flight information and GPS data. It also displays ground mapping, UAVs position relative to the GPS data received from the UAV.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. An unmanned airborne reconnaissance vehicle having:
   a fuselage;
   a forward wing pair and a rearward wing pair, the forward wing pair having a leading edge, a trailing edge, a wing root and a wing tip, the rearward wing pair having a leading edge, a trailing edge, a wing root and a wing tip, the two wing pairs being separated vertically in side view by a gap at the roots and at the tips thereof and, in plan view, defining stagger between the trailing edge of the forward wing pair and the leading edge of the rearward wing pair;
   a pair of tip plates for joining the vertically and horizontally separated wing tips; and
   a power plant to propel the vehicle through the air.

2. The vehicle of claim 1 further comprising a substantially "T" shaped tail having a vertical stabilizer with a rudder and an elevator.

3. The vehicle of claim 2, wherein the elevator is a stabilator.

4. The vehicle of claim 1, wherein the gap is in the range of 4 to 6 inches at the root and in the range of 2 to 5 inches at the tip.

5. The vehicle of claim 1, wherein the stagger of the wing pairs is in the range of 16 to 24 inches at the root and 0 to 10 inches at the tip.

6. The vehicle of claim 1, wherein the two wing pairs are uncranked and have straight leading and trailing edges.

7. The vehicle of claim 1, wherein the rear wing pair includes ailerons and further including an empennage having a rudder and an elevator.

8. The vehicle of claim 1, wherein the wings are comprised of one or more of the following materials: fiberglass, carbon fiber, kevlar or polyurethane.

9. The vehicle of claim 1 further comprising a tricycle landing gear for engagement with the fuselage.

10. The vehicle of claim 1 further comprising an emergency parachute recovery system.

11. The vehicle of claim 1, wherein the power plant includes a single engine for driving a propeller mounted either at the front of the fuselage as a tractor, or at the rear of the fuselage as a pusher.

12. The vehicle of claim 1, wherein the two wing pairs are positively staggered.

13. The vehicle of claim 12, wherein the forward pair of wings has anhedral in the range of +10 to −10 degrees and the rearward pair of wings has dihedral in the range of +10 to −10 degrees.

14. The vehicle of claim 1 wherein the fuselage further includes a ventral fin.

15. The vehicle of claim 1, further including an airfoil defined by Table I.

16. The vehicle of claim 1, wherein the wing span of the forward wing pair is between 80 and 120 inches and the wing span of the rearward wing pair is between 80 and 120 inches, the leading edge sweep of the forward wing pair is between 0 and 20 degrees, the trailing edge sweep of the rearward wing pair is between 0 and 20 degrees, the forward wing pair wherein the forward wing pair has anhedral between −10 and +10 degrees, the rearward wing pair has dihedral between −10 and +10 degrees, the forward wing pair has a root chord of between 10 and 15 inches, the rearward wing pair has a root chord of between 10 and 15 inches, the forward wing pair has a tip chord of between 5 and 10 inches and the rearward wing pair has a tip chord of between 5 and 10 inches, and the angle of attack of the two wing pairs is between −2 and +2 degrees.

17. The vehicle of claim 16, wherein the gap at the tip is between 0 and 5 inches and the gap at the root chord is between 4 and 8 inches and the stagger between the leading edge of the forward wing pair and the leading edge of the rearward wing pair is between 15 and 25 inches at the wing root and 0 and 25 inches at the wing tip.

18. The vehicle of claim 1, wherein the two wing pairs are removably fastened to the fuselage by quick disconnect means.

19. The vehicle of claim 1 further comprising sensory means.

20. The vehicle of claim 1 further comprising navigator means capable of being preprogrammed with one or more flight plans.

* * * * *